(12) United States Patent
Ghent et al.

(10) Patent No.: US 6,631,622 B1
(45) Date of Patent: Oct. 14, 2003

(54) DEMAND SIDE MANAGEMENT OF FREEZER SYSTEMS

(75) Inventors: Bobby A. Ghent, St. Joseph, MI (US); Marco Monacchii, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 10/127,750

(22) Filed: Apr. 22, 2002

Related U.S. Application Data

(60) Provisional application No. 60/366,829, filed on Mar. 22, 2002.

(51) Int. Cl.[7] .............................. F25B 19/00; F23N 5/20
(52) U.S. Cl. ........................................ 62/231; 236/46 R
(58) Field of Search ........................ 62/231, 234, 157, 62/238.6, 228.1; 236/46 R, 46 F; 337/301

(56) References Cited

U.S. PATENT DOCUMENTS

| | | |
|---|---|---|
| 4,245,319 A | 1/1981 | Hedges |
| 4,247,786 A | 1/1981 | Hedges |
| 4,310,770 A | 1/1982 | Keener et al. |
| 4,357,665 A | 11/1982 | Korff |
| 4,390,876 A | 6/1983 | Bjorklund et al. |
| 4,446,359 A | 5/1984 | Arribas et al. |
| 4,467,178 A | 8/1984 | Swindle |
| 4,549,274 A | 10/1985 | Lerner et al. |
| 4,551,812 A | 11/1985 | Gurr et al. |
| 4,612,619 A | 9/1986 | Culp |
| 4,694,192 A | 9/1987 | Payne et al. |
| 4,819,180 A | 4/1989 | Hedman et al. |
| 4,874,926 A | 10/1989 | Sanders |
| 4,879,878 A * | 11/1989 | Polkinghorne ............... 62/187 |
| 4,909,041 A * | 3/1990 | Jones ........................... 62/99 |
| 4,998,024 A | 3/1991 | Kirk et al. |
| 5,414,640 A | 5/1995 | Seem |
| 5,415,005 A * | 5/1995 | Sterber et al. ................. 62/154 |
| 5,436,510 A | 7/1995 | Gilbert |
| 5,481,140 A | 1/1996 | Maruyama et al. |
| 5,515,692 A * | 5/1996 | Sterber et al. ................. 62/154 |
| 5,543,666 A | 8/1996 | Priesemuth |
| 5,581,132 A | 12/1996 | Chadwick |
| 5,696,695 A | 12/1997 | Ehlers et al. |
| 5,818,725 A | 10/1998 | McNamara et al. |
| 5,834,855 A | 11/1998 | Chiba |
| 5,880,536 A | 3/1999 | Mardirossian |
| 5,924,486 A | 7/1999 | Ehlers et al. |
| 6,084,318 A | 7/2000 | Mardirossian |
| 6,208,040 B1 | 3/2001 | Mardirossian |
| 6,393,861 B1 * | 5/2002 | Levenduski et al. .......... 62/434 |
| 6,453,687 B2 * | 9/2002 | Sharood et al. ............... 62/127 |
| 2001/0018750 A1 | 8/2001 | Trice et al. |
| 2002/0019758 A1 | 2/2002 | Scapelli |
| 2002/0019802 A1 | 2/2002 | Malme et al. |
| 2002/0023234 A1 | 2/2002 | Berman et al. |

* cited by examiner

*Primary Examiner*—Marc Norman
(74) *Attorney, Agent, or Firm*—Stephen Krefman; Robert O. Rice; John F. Colligan

(57) ABSTRACT

The invention provides a freezer system having a freezer, a thermoelectric device, and a controller. The freezer may include a compressor and a compartment, where the compartment may store subfreezing air. The thermoelectric device may be a temperature sensor positioned in thermal communication with the compartment. The controller may be coupled to the compressor and the thermoelectric device. The controller is configured to deliver power to the compressor based on a temperature signal and a control signal. The temperature signal may be from the thermoelectric device and the control signal may be selected from an off/on peak signal and an override signal.

15 Claims, 2 Drawing Sheets

DEMAND SIDE MANAGEMENT OF FREEZER SYSTEMS

This application claims the benefit of provisional application Ser. No. 60/366,829 filed Mar. 22, 2002.

BACKGROUND OF THE INVENTION

The present invention relates to managing freezer operations as a function of off-peak energy demand periods.

A freezer typically includes a thermally insulated compartment that maintains subfreezing air. Some freezers are attached to a refrigerator while other freezers are freestanding. Many freezers permit a consumer to set an internal air temperature of the freezer to between −20 degrees and 20 degrees Fahrenheit (F.) (−29 degrees to −7 degrees Celsius (C.)). To rapidly freeze and store food items and to save energy, most consumers maintain the freezer air temperature at around zero degrees F. (−18 degrees C.).

In contrast to a refrigerator, a freezer typically has only one energy-using device: a compressor. A thermomechanic device such as a thermostat typically controls the on/off operations of the compressor to create and maintain subfreezing air. When energized, the compressor is used to draw out heat from the interior of the freezer. However, freezers require a significant amount of energy to create subfreezing air.

The energy costs to create subfreezing air in a freezer may depend upon the time of day. In areas of the United States where energy is at a premium, utility companies often divide their rates into off-peak and on-peak energy rates based on off-peak and on-peak energy demand periods. Energy used during off-peak may cost the consumer in United States dollars around 2¢ to 3¢ per kilowatt-hour (kWh) while on-peak energy may cost anywhere from 6¢ per kWh to 50¢ or more per kWh. The utility companies eventually pass these extra costs to the consumer. In a recent California energy crisis, the wholesale cost of energy rose to $3.00 per kWh.

Without some sort of management, a freezer that creates subfreezing air based on the demand of a household most likely will operate when energy demand on a utility company is at its highest. Drawing power to create subfreezing air during these on-peak periods increases a consumer's monthly energy bill. In the collective, this lack of demand side management places excessive wear on a power plant to shorten the overall life of the plant.

Many utility companies have off-peak energy usage programs that provide lower energy rates. These lower energy rates apply so long as the consumer's appliance draws power only during off-peak times. Off-peak energy usage programs typically aid in reducing on-peak demand. However, there may be times during the on-peak periods when the temperature of the consumer's freezer is above levels at which food may be stored safely. Here, the consumer may override the clock timer to bring the temperature within safety levels but will incur significant kWh energy charges. What is needed is a system that manages the creation of subfreezing air in a freezer during the off-peak periods to supply needs of a consumer during the on-peak periods, to time shift consumer demands on power plants, and to save the consumer money.

SUMMARY OF THE INVENTION

In light of the above noted problems, the invention works towards providing a system that creates subfreezing temperatures in a freezer during the off-peak periods. During the off-peak periods, the freezer system invention may subfreeze the interior temperature in a freezer to very low temperatures that may last throughout a normal day's use of the freezer, including during the on-peak periods. Since the freezer subfreezes during off-peak periods, consumer demands on power plants may be shifted away from on peak periods and the consumer may save money.

Thus, in a preferred embodiment, the invention provides a freezer system having a freezer, a thermoelectric device, and a controller. The freezer may include a compressor and a compartment, where the compartment may store subfreezing air. The thermoelectric device may be a temperature sensor positioned in thermal communication with the compartment. The controller may be coupled to the compressor and the thermoelectric device. The controller is configured to deliver power to the compressor based on a temperature signal and a control signal. The temperature signal may be from the thermoelectric device and the control signal may be selected from an off/on peak signal and an override signal.

These and other objects, features, and advantages of the present invention will become apparent upon a reading of the detailed description and a review of the accompanying drawings. Specific embodiments of the present invention are described herein. The present invention is not intended to be limited to only these embodiments. Changes and modifications can be made to the described embodiments and yet fall within the scope of the present invention.

DETAILED DESCRIPTION OF THE PREFERRED EMBODIMENTS

Figure 1:
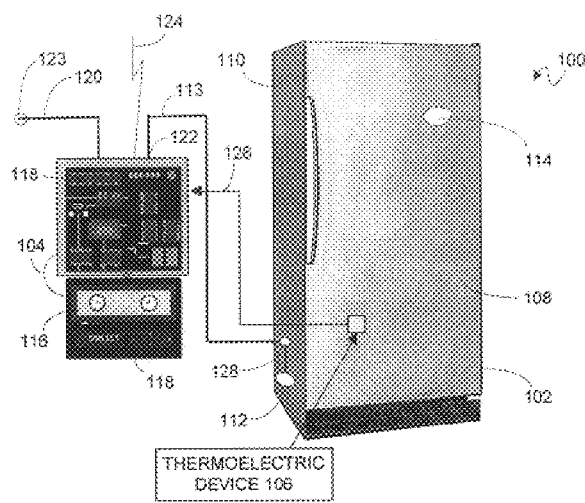
FIG. 1 is an elevated isometric view of a freezer system.

FIG. 1 is an elevated isometric view of a freezer system 100. The freezer system 100 may include a freezer 102, a control panel 104, and a thermoelectric device 106. The control panel 104 and the thermoelectric device 106 may be retrofit into a freezer already in existence or in service. Moreover, new freezers may include the control panel 104 and the thermoelectric device 106.

The freezer 102 may be any device having a compressor and a compartment, such as a cabinet, or room, to maintain subfreezing air. The freezer 102 may include a door 108, a cabinet 110, and a compressor 112. When closed against the cabinet 110, the door 108 and the cabinet 110 may form a compartment 114 that acts as a reservoir for subfreezing air.

The compressor 112 may include refrigerant, an evaporator, and a condenser. The compartment 114 may include coils attached to the compressor 112 to circulate the refrigerant through the compartment 114. In operation, the compressor 112 may exert pressure on a vaporized refrigerant and force the refrigerant to pass through the condenser, where the refrigerant loses heat and liquefies. The refrigerant may then move through the coils of the compartment 114. There, the refrigerant may vaporize in the evaporator, drawing heat from whatever is in the compartment 114. The refrigerant then may pass back to the compressor 112 to repeat the cycle. A power cord 113 may deliver power to the compressor 112.

The control panel 104 may include a timer 116 and an interface 118. The timer 116 may be a switch or regulator that controls or activates and deactivates another mechanism at set times. The timer 116 may be a programmable seven-day timer. Moreover, the timer 116 may include at least one variable state output to indicate whether a current time is on-peak or off-peak.

The interface 118 may be a manual user interface having buttons, displays, and the like to permit a user to communicate to the control panel 104 and receive information from the control panel 104. The interface 118 may permit a user to input a plurality of on-peak and off-peak settings for each day into the control panel 104. The on-peak and off-peak settings may be independent from each other.

The control panel 104 also may include a power cord 120 and a socket 122. The power cord 120 of the control panel 104 may be plugged into a socket 123. The socket 123 may be a household wall outlet. The power cord 113 of the compressor 112 may be plugged into the socket 122 of the control panel 104.

The power cord 120 may receive electrical power from the socket 123 and deliver the electrical power to the control panel 104. In turn, the control panel 104 may deliver electrical power to the compressor 112 through the power cord 113. The delivery of this power to the compressor 112 from the control panel 104 may be a function of the on-peak and off-peak settings.

The control panel 104 may communicate to one or more control sources through a signal line 124. The signal line 124 may be any pathway configured to pass a signal from one location to another location. The signal line 124 may be in communication with devices within a home or outside of the home. For example, the signal line 124 may receive remote information. This remote information may include off-peak and on-peak information from a power plant or status information from devices within the home. The off-peak and on-peak information may be input into the control panel 104 automatically as a plurality of on-peak and off-peak settings for each day. The signal line 124 may transmit and receive information through a variety of techniques, such as over a telephone line, over the Internet, or through free space such as by radio waves.

Conventionally, a user may plug the freezer 102 directly into the socket 123 to receive power to run the compressor 112. The power may be routed through a circuit controlled by a thermomechanic device 128. In general, the thermomechanic device 128 may be a device that mechanically responds to temperature changes to either make or break the power circuit. The thermomechanic device 128 may be a thermostat.

One of the components of the thermomechanic device 128 may expand or contract significantly in response to a temperature change. For example, heated mercury may expand to touch an electrical contact to complete a circuit as part of a mercury thermostat. A different design may use a bimetallic strip made of two thin metallic pieces of different composition bonded together. As the temperature of the strip changes, the two pieces change length at different rates, forcing the strip to bend. This bending may cause the strip to make or break the circuit.

When the freezer 102 is plugged directly into the socket 123, the thermomechanic device 128 may provide sole control over the flow of power to the compressor 112 to maintain a predetermined temperature in the compartment 114. If the thermomechanic device 128 provides the sole control over the flow of power to the compressor 112, then the compressor 112 undesirably may operate during on-peak rates. To provide more control over the operations of the compressor 112, the freezer system 100 may include the thermoelectric device 106.

In contrast to the mechanical on/off actions of the thermomechanic device 128, the thermoelectric device 106 may perceive the actual temperature inside the compartment 114 and generate a signal proportional to the actual temperature. The generated signal may be a voltage signal in millivolts (mV), for example. The thermoelectric device 106 may transmit the voltage signal to the control panel 104 over a signal line 126. The control panel 104 may convert the voltage signal to related temperature in degrees F. or degrees C. In one embodiment, the thermoelectric device 106 may be a temperature switch. As an example, the thermoelectric device 106 may consist of two dissimilar metals joined so that a voltage difference generated between points of contact is a measure of the temperature difference between the points.

Through the interface 118 of the control panel 104, a consumer may input the Sunday, Monday, Tuesday, Wednesday, Thursday, Friday, and Saturday off-peak/on-peak demand periods and/or off-peak/on-peak rates into the timer 116. The consumer may also input a vacation schedule, a holiday schedule, or a business schedule, each as a function of the on-peak or off-peak entries. The signal line 124 also may deliver this information into the control panel 104 from, for example, a power plant. The control panel 104 may respond to this information by managing whether the freezer 102 operates during an on-peak demand period or operates above particular energy rates.

Figure 2:
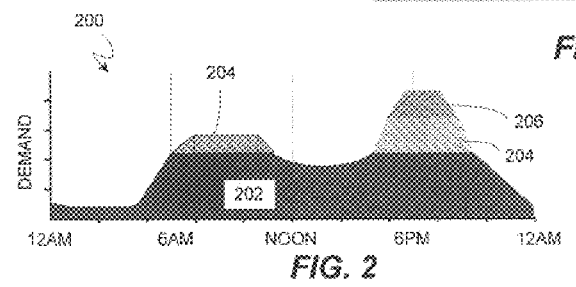
FIG. 2 is a graph illustrating a typical off-peak and on-peak demand over a twenty-four-hour operating period.

FIG. 2 is a graph 200 illustrating a typical off-peak and on-peak demand over a twenty-four-hour operating period. From midnight to about six in the morning, the demands for energy may be low, such that off-peak rates 202 may apply. From about six in the morning to about eleven in the morning, demands for energy may be high, such that on-peak rates 204 may apply. The energy demands may drop in the afternoon and pick up around five in the afternoon. From around five in the afternoon to around nine in the evening, the demands for energy again may be high. These high demands may increase the cost of energy to on-peak rates 204. The demands for energy may be so great that special on-peak rates 206 may apply. Off-peak energy may cost in United States dollars around 2¢ to 3¢ per kWh. Significantly, on-peak energy may cost the consumer anywhere from 6¢ per kWh to 50¢ or more per kWh.

Figure 3:
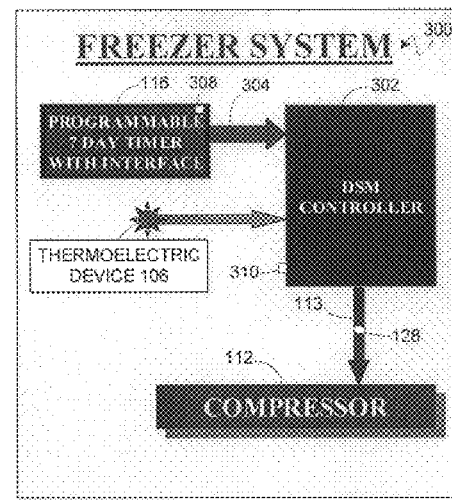
FIG. 3 is a schematic diagram of components and interconnections of the freezer system.

FIG. 3 is a schematic diagram 300 of components and interconnections of the freezer system 100. The timer 116 may be in direct communication with a controller 302 through a signal line 304. The controller 302 may be part of the control panel 104. The controller 302 may control the compressor 112 through power supplied into the power cord 113. In some instances, the thermomechanic device 128 may provide further control over the delivery of power to the compressor 112.

The controller 302 may include an internal clock synchronized with the local time of day as the current time. When the timer 116 closes a switch 308, the timer 116 may send a constant high-input to the controller 302 during off-peak periods of each day of the week. This high-input signal may contribute to the control over the operations of the compressor 112. The terms "high-input" and "low-input" are relative and a low-input signal may operate the devices of the invention.

The freezer system 300 may include an override switch 310 connected to the controller 302. The override switch 310 may be connected in parallel with the thermoelectric device 106. A demand request from either the override switch 310 or the thermoelectric device 106 may augment or bypass the control of the timer 116 over the operations of the compressor 112. The demand request may be manual or automatic.

To provide a manual demand request, the override switch 310 may bypass the signals from the timer 116 and instruct the compressor 112 through the controller 302 to begin subfreezing the air in the compartment 114. Manually depressing the override switch 310 may activate the override switch 310. In view of this manual demand request, the compressor 112 maybe limited as to how much heat the compressor 112 removes from the air in the compartment 114. For example, the compressor 112 may subfreeze the air in the compartment 114 to only about 2 degrees F. (about −17 degree C.) if activated by this manual demand request.

To provide an automatic demand request, the thermoelectric device 106 may work as an automatic demand to bypass the signals from the timer 116. The thermoelectric device 106 may be set to begin the subfreezing of the air in the compartment 114 under certain circumstances. For example, if the air temperature in the compartment 114 is approaching an unsafe value, the thermoelectric device 106 may activate the compressor 112. Although the thermoelectric device 106 may activate the compressor 112 during on-peak energy periods, this may be a more efficient option than permitting food to spoil. An example of an unsafe temperature value may be about 10 degrees F. (−12 degrees C.).

Activating the compressor 112 during on-peak energy periods may drive up operation costs. The controller 302 may place a limit on its operation to avoid excessive expense. For example, if the air temperature in the compartment 114 rises above a predetermined level and more subfreezing is requested, the controller 302 may activate the compressor 112 only if the compressor 112 has not been activated within the past ninety minutes, for example. A ninety-minute inhibit timer may be used for this purpose. Even if activated by this automatic demand request, the compressor 112 may be limited as to how much heat the compressor 112 removes from the air in the compartment 114. For example, the compressor 112 may subfreeze the air in the compartment 114 to only about 5 degrees F. (about −15 degrees C.) if activated by this automatic demand request.

Figure 4:
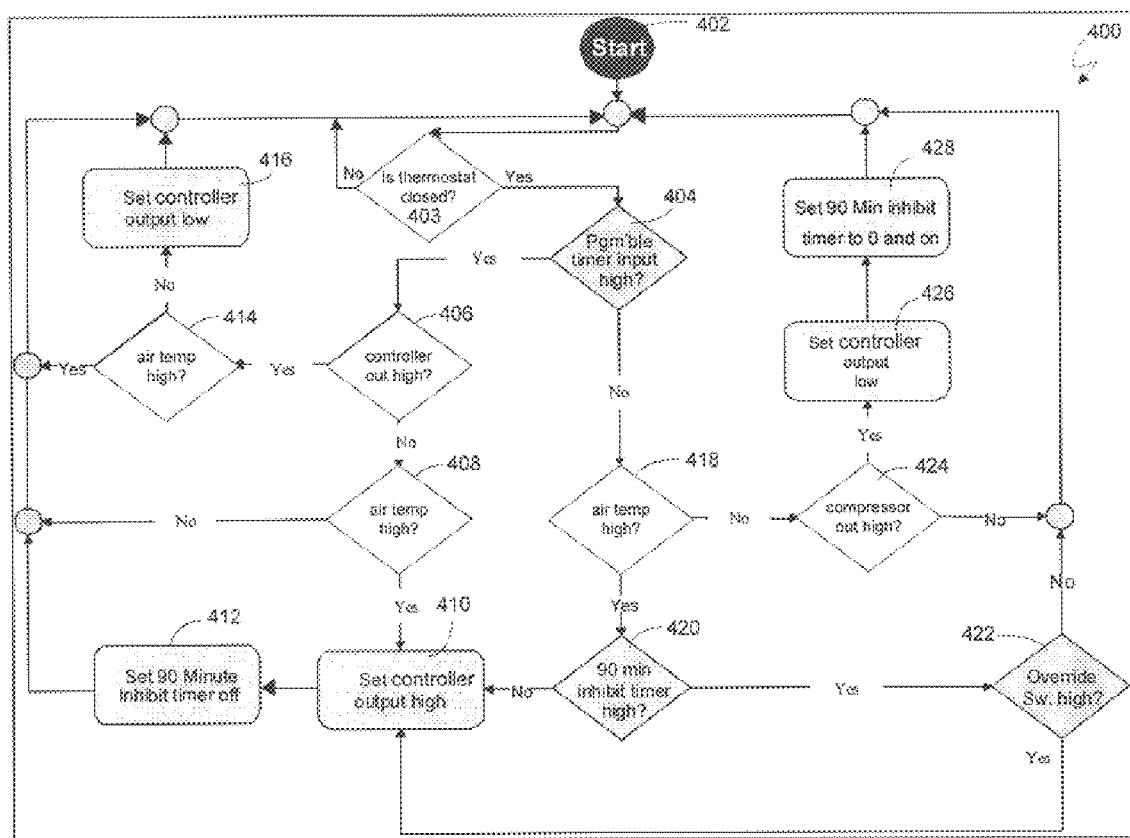
FIG. 4 is a flow chart illustrating a method to manage the freezer system through software of a demand side management (DSM) controller.

FIG. 4 is a flow chart illustrating a method 400 to manage the freezer system 100 through the software of the controller 302. A machine-readable medium having stored instructions may implement the method 400. For example, a set of processors may execute the instructions to cause the set of processors to perform the method 400. A machine-readable medium may include any mechanism for storing or transmitting information in a form readable by a machine (e.g., a computer). A machine-readable medium may include read only memory (ROM), a random access memory (RAM), a magnetic disk storage media, an optical storage media, and flash memory devices. The machine-readable medium may include electrical, optical, acoustical or other form of propagated signals such as carrier waves, infrared signals, and digital signals.

The method 400 may start at 402 and proceed to step 403. At step 403, the method 400 may determine whether the thermomechanic device 128 is closed. A close thermomechanic device 128 may mean that heated mercury touches an electrical contact or that a bimetallic strip bends to bridge a power circuit. If the thermomechanic device 128 is not closed, the method 400 may return to step 403. If the thermomechanic device 128 is closed, then the method 400 may proceed to step 404.

At step 404, the method 400 may determine whether an input to the timer 116 is high. A high-input into the timer 116 may close the switch 308. A closed switch 308 may imply an off-peak demand period such as seen in certain areas of region 202 of FIG. 2. A closed switch 308 may imply an off-peak demand rate.

If the input to the timer 116 is high, the method 400 may determine at step 406 whether the output of the controller 302 is high. A high output of the controller 302 may provide subfreezing signals to the compressor 112.

If the output of the controller 302 is not high at step 406, then the method 400 may proceed to step 408. At step 408, the method 400 may determine whether the air temperature of the compartment 114 is above a first preset temperature. An example of the first preset temperature may be about 5 degrees F. (about −15 degrees C.). If the air temperature in the compartment 114 is not above the first preset temperature, then there may be no need to reduce the air temperature in the compartment 114. Thus, the method 400 may then return to step 403. If the air temperature in the compartment 114 is above the first preset temperature, then the method 400 may set the output of the controller 302 to high at step 410. A high output received at the compressor 112 from the controller 302 may activate the compressor 112. With the compressor 112 activated, the method 400 may set the inhibit timer to off at step 412. The method 400 may then return to step 403.

If the output of the controller 302 is high at step 406, then the method 400 may proceed to step 414. At step 414, the method 400 may determine whether the air temperature in the compartment 114 is above a second preset temperature. The second preset temperature may be about −10 degrees F. (about −23 degrees C.). If the air temperature in the compartment 114 is above the second preset temperature, then the compressor 112 may continue to subfreeze the air in the compartment 114. The method 400 then may return to step 403. If the air temperature in the compartment 114 is at or below the second preset temperature, then setting the controller 302 to low at step 416 may turn off the compressor 112. With the air temperature at or below the second preset temperature, the freezer 102 may supply a consumer with an entire day's worth of subfreezing air. From step 416, the method may return to step 403.

It may be desirable to subfreeze the air in the compartment 114 during an off-peak demand period or when an off-peak rate applies. Step 404 through step 416 address the situation where the timer 116 indicated an off-peak demand period or off-peak rate. If the input to the timer 116 is low at step 404, then the timer 116 may indicate an on-peak demand period or on-peak rate. There may be circumstances where a user desires to subfreeze the air in the compartment 114 during an on-peak demand period or when an on-peak rate applies.

If the input to the timer 116 is low at step 404, the method 400 may determine at step 418 whether the air temperature in the compartment 114 is above a third preset temperature. The third preset temperature may be, for example, about 10 degrees F. (about −12 degrees C.). This part of the method 400 may provide for manual, automatic, or semi-automatic demand overrides of the timer 116 settings.

If the air temperature in the compartment 114 is above the third preset temperature at step 418, the method 400 may determine whether the controller 302 recently activated the compressor 112. The method 400 may make this determination at step 420 by determining whether the inhibit timer is high.

If the inhibit timer is not high at step 420, that is, if the controller 302 has not recently activated the compressor 112, then the method 400 may permit automatic demand overrides of the timer 116. For example, the thermoelectric device 106 (FIG. 3) may have indicated that the air temperature in the compartment 114 is too high for current demands made on the air in the compartment 114. The method 400 may proceed to step 410 if the inhibit timer is not high at step 420. At step 410, the method may set the output of the controller 302 to high.

If the inhibit timer is high at step 420, that is, if the controller 302 recently activated the compressor 112, then the method 400 may prevent automatic demand overrides of the timer 116. However, the method 400 still may permit manual demand overrides of the timer 116. The method 400 may proceed to step 422 if the inhibit timer is high at step 420.

At step 422, the method 400 may determine whether the override switch 310 (FIG. 3) is high. A high override switch 310 may present a request for a manual demand override. If the override switch 310 is high at step 422, then the method 400 may proceed to step 410 and set the output of the controller 302 to high. If the override switch 310 is not high at step 422, then the method 400 may return to step 403, recognizing that the consumer most likely did not request a manual override.

If the air temperature in the compartment 114 is not above the third preset temperature at step 418, then the air temperature in the compartment 114 may be at a safe level. The method 400 may proceed to step 424 and determine whether the output of the controller 302 is high. Recall that a high output of the controller 302 may activate the compressor 112.

If the output of the controller 302 is not high at step 424, then the method 400 may return to step 403. If the output of the controller 302 is high at step 424, then the method 400 may then turn off the compressor 112. The method 400 may turn off the compressor 112 by setting the controller 302 to low at step 426. The inhibit timer may be initialized to zero minutes and turned on at step 428. From step 428, the method 400 may return to step 403.

Among other differences, the freezer system 100 may differ from conventional Systems in that the freezer system 100 may utilize the lowermost temperature setting of the freezer 102. This may subfreeze the air in the compartment 114 (FIG. 1) to a very low, initial temperature. When the door 108 is open to mix warm air with very cold air, the freezer system 100 may maintain a subzero temperature where the initial temperature of the freezer 102 is very low. This generally is true even if the door 108 is opened several times a day. Importantly, this subfreezing may be performed during the off-peak demand period when energy rates may be at their lowest. This saves consumers money and time shifts demands on power plants. By subfreezing the air in the compartment 114 in the early morning hours to very low temperatures, the freezer 102 may retain the subzero temperature air needs of a typical household throughout the day and night without requiring a resubfreezing of the air in the compartment 114.

The present invention has been described utilizing particular embodiments. As will be evident to those skilled in the art, changes and modifications may be made to the disclosed embodiments and yet fall within the scope of the present invention. The disclosed embodiments are provided only to illustrate aspects of the present invention and not in any way to limit the scope and coverage of the invention. The scope of the invention is therefore to be limited only by the appended claims.

The embodiments of the invention in which an exclusive property or privilege is claimed are defined as follows:

1. A freezer system having a compressor and a compartment, where the compartment is configured to store subfreezing air;
    a thermoelectric device positioned in thermal communication with the compartment;
    a controller located remote from the freezer and including a manual user interface, the controller being coupled to the compressor and the thermoelectric device, where the controller is configured to deliver power to the compressor based on a temperature signal and a control signal, where the temperature signal is from the thermoelectric device and the control signal is selected from a group of comprising an off/on peak signal and an override signal; and
    a thermomechanic device connected between the compressor and the controller.

2. The freezer system of claim 1, where the thermomechanic device is a thermostat.

3. A freezer system having a compressor and a compartment, where the compartment is configured to store subfreezing air;
    a thermoelectric device positioned in thermal communication with the compartment; and
    a controller including a programmable timer coupled to the compressor and the thermoelectric device, where the controller is configured to deliver power to the compressor based on a temperature signal and a control signal, where the temperature signal is from the thermoelectric device and the control signal is selected from a group of comprising an off/on peak signal and an override signal and where the programmable timer is a seven-day programmable timer configured to receive a plurality of on-peak and off-peak settings for each day, and where the programmable timer includes at least one variable state output to indicate whether a current time is on-peak or off-peak.

4. A freezer system having a compressor and a compartment, where the compartment is configured to store subfreezing air;
    a thermoelectric device positioned in thermal communication with the compartment; and
    a controller coupled to the compressor and the thermoelectric device, where the controller is configured to deliver power to the compressor based on a temperature signal and a control signal, where the temperature signal is from the thermoelectric device and the control signal is selected from a group of comprising an off/on peak signal and an override signal and where the controller includes a manual override switch to manually override the temperature signal from the thermoelectric device.

5. The freezer system of claim 4, where the controller includes an automatic override switch to automatically override the temperature signal from the thermoelectric device, where the automatic override switch is connected in parallel with the manual override switch.

6. A kit to retrofit a freezer, the freezer having a compressor connected to a thermostat, the kit comprising:
    a thermoelectric device to provide internal temperature signals; and
    a controller configured to be coupled to the thermoelectric device and the compressor, where the controller includes a manual override switch to manually override the temperature signal from the thermoelectric device.

7. The kit of claim 6, where the controller includes an automatic override switch to automatically override the temperature signal from the thermoelectric device, where the automatic override switch is connected in parallel with the manual override switch.

8. A method to manage a freezer system, comprising:

determining whether a current period is an off-peak period or an on-peak period; and if the current period is an off-peak period, engaging a controller coupled to a compressor of a freezer to subfreeze compartment air in the freezer to a predetermined temperature.

9. The method of claim 8, further comprising:

determining whether a timer input signal to a timer is high;

if the timer input signal is high, then determining whether the controller is sending an activation signal to the compressor;

if the controller is sending an activation signal to the compressor, then determining whether the temperature of compartment air is high; and if the temperature of compartment air is not high, then turning off the compressor.

10. The method of claim 9, where if the controller is not sending an activation signal to the compressor, then activating the compressor when the compartment air is above a predetermined temperature.

11. The method of claim 8, further comprising:

determining whether a timer input signal to a timer is high;

if the timer input signal is not high, then determining whether the temperature of compartment air is high;

if the temperature of compartment air is high, then determining whether an inhibit timer is high; and if the inhibit timer is not high, then setting an output of the compressor to high to subfreeze compartment air in the freezer to a predetermined temperature.

12. A machine-readable medium having stored thereon instructions which, when executed by a set of processors, cause the set of processors to perform the following:

determining whether a current period is an off-peak period or an on-peak period; and if the current period is an off-peak period, engaging a controller coupled to a compressor of a freezer to subfreeze compartment air in the freezer to a predetermined temperature.

13. The machine-readable medium of claim 12, further comprising:

determining whether a timer input signal to a timer is high;

if the timer input signal is high, then determining whether the controller is sending an activation signal to the compressor;

if the controller is sending an activation signal to the compressor, then determining whether the temperature of compartment air is high; and if the temperature of compartment air is not high, then turning off the compressor.

14. The machine-readable medium of claim 13, where if the controller is not sending an activation signal to the compressor, then activating the compressor when the compartment air is above a predetermined temperature.

15. The machine-readable medium of claim 12, further comprising:

determining whether a timer input signal to a timer is high;

if the timer input signal is not high, then determining whether the temperature of compartment air is high;

if the temperature of compartment air is high, then determining whether an inhibit timer is high; and if the inhibit timer is not high, then setting an output of the compressor to high to subfreeze compartment air in the freezer to a predetermined temperature.

* * * * *